United States Patent [19]

Scott

[11] 4,288,052

[45] Sep. 8, 1981

[54] BASE FOR FREE STANDING MERCHANDISER

[76] Inventor: George B. Scott, 1727 Crystal La., Apartment 411, Mount Prospect, Ill. 60056

[21] Appl. No.: 42,030

[22] Filed: May 24, 1979

[51] Int. Cl.³ .......................................... F16M 11/32
[52] U.S. Cl. ................................. 248/188.6; 248/158; 248/188.7
[58] Field of Search ................. 248/158, 188.6, 188.7, 248/418, 524

[56] References Cited

U.S. PATENT DOCUMENTS

| 552,502 | 1/1896 | Andrews | 248/188.7 |
|---|---|---|---|
| 2,670,163 | 2/1954 | Armitage | 248/524 |
| 2,699,308 | 1/1955 | Shackelford | 248/524 |
| 2,908,461 | 10/1959 | Coffeen | 248/524 X |
| 3,387,808 | 6/1968 | Metcalf | 248/188.6 X |
| 3,787,018 | 1/1974 | Nathan | 248/188.7 X |
| 4,032,098 | 6/1977 | Marschak | 248/188.7 X |

Primary Examiner—William H. Schultz
Attorney, Agent, or Firm—Fitch, Even, Tabin, Flannery & Welsh

[57] ABSTRACT

The disclosed collapsible stand has two sets of opposed legs extending radially from a tubular hub support, the stand being of the type that is collapsed or set up by rotating one set of legs relative to the other set of legs about the hub support until the legs are at 90° to each other. Each leg is formed of an elongated rod back folded on itself to present inner and vertically spaced inner ends that are secured to the discs mounted on the hub support with an outer center portion of the back folded rod engaging the floor and serving as a foot for the stand. The inner ends of the legs are sandwiched between a pair of discs movably and rotatably mounted on the tubular hub support. Two pairs of locking or detenting tabs are upstruck from each of the lower discs, each pair of tabs being spaced apart to define a leg receiving slot therebetween. Preferably, the inner ends of the legs are each disposed between a pair of detents to provide a firm and stable support. The resiliency of the back folded rods of the inner support element urges the rod ends into the slots between the tabs and a squeezing of the inner ends of the rods will shift the inner ends from the detent slots whereby a subsequent turning of the legs and their discs allows the legs to be collapsed to positions adjacent each other. The stand is economically fabricated and yet has a pleasing appearance in that the upper discs are unmarred and cover the detent tabs.

11 Claims, 6 Drawing Figures

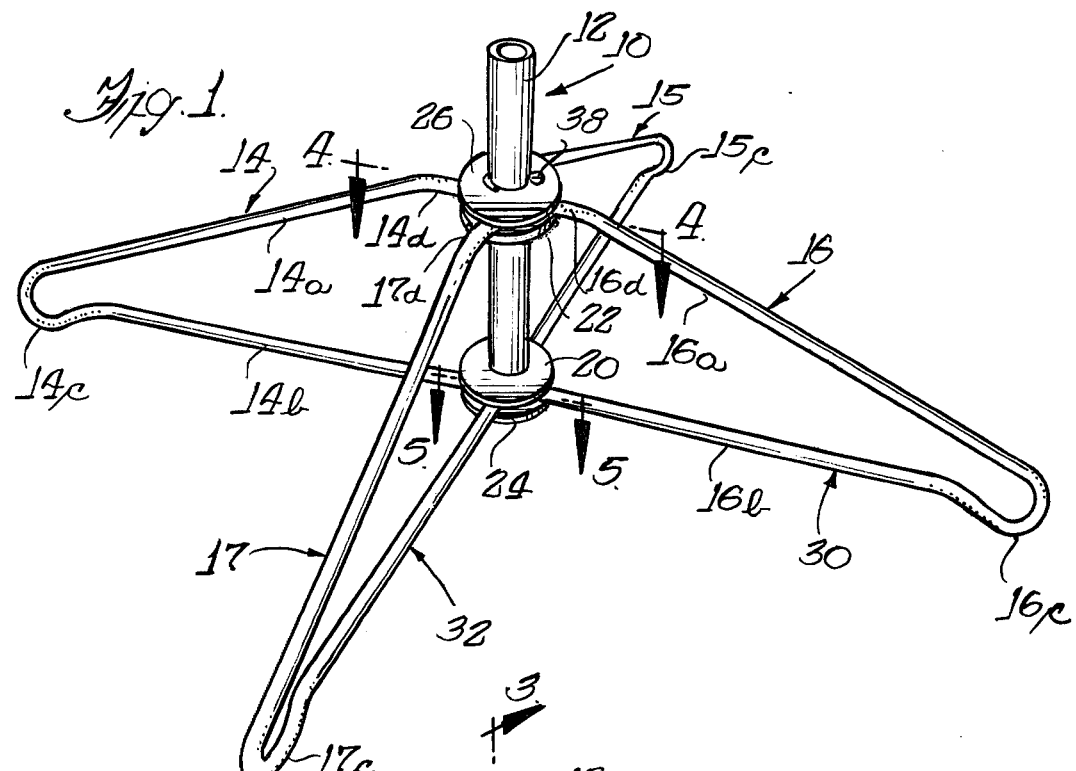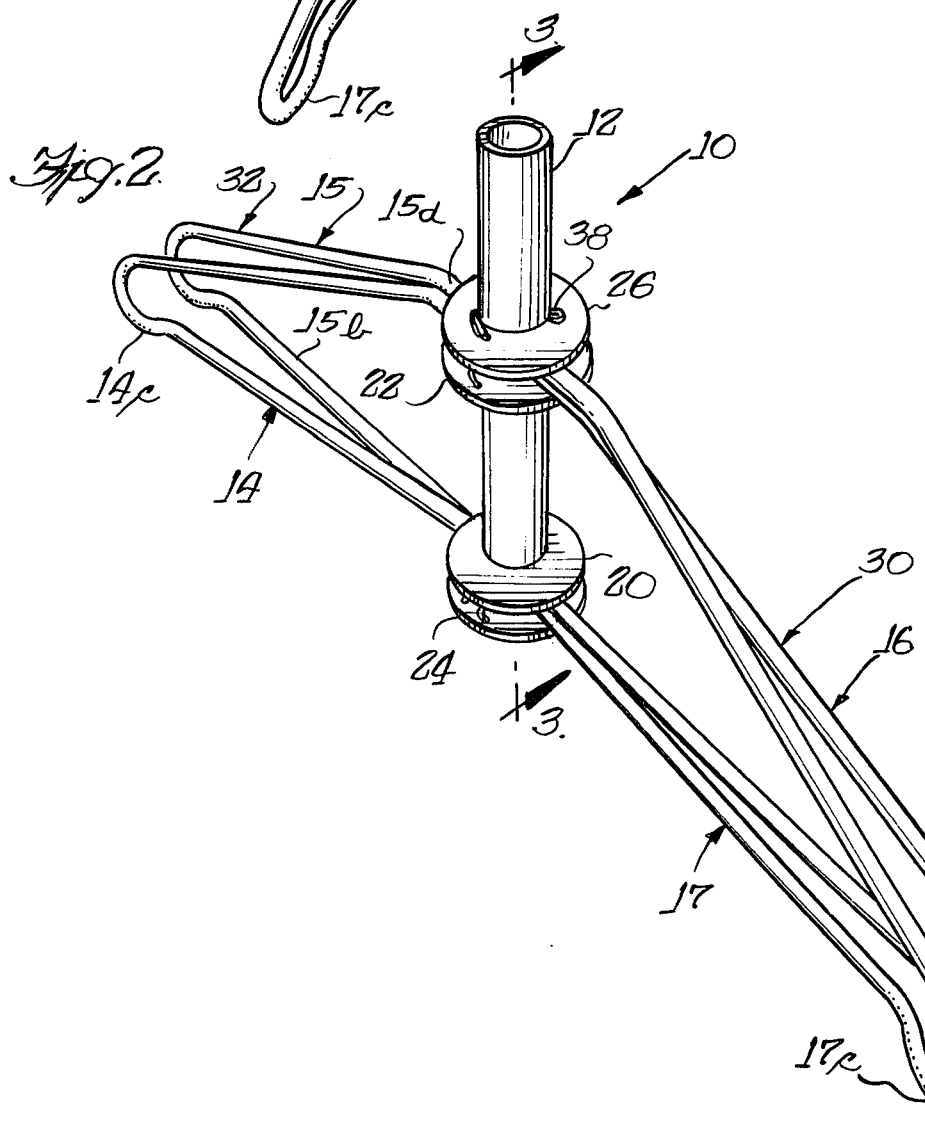

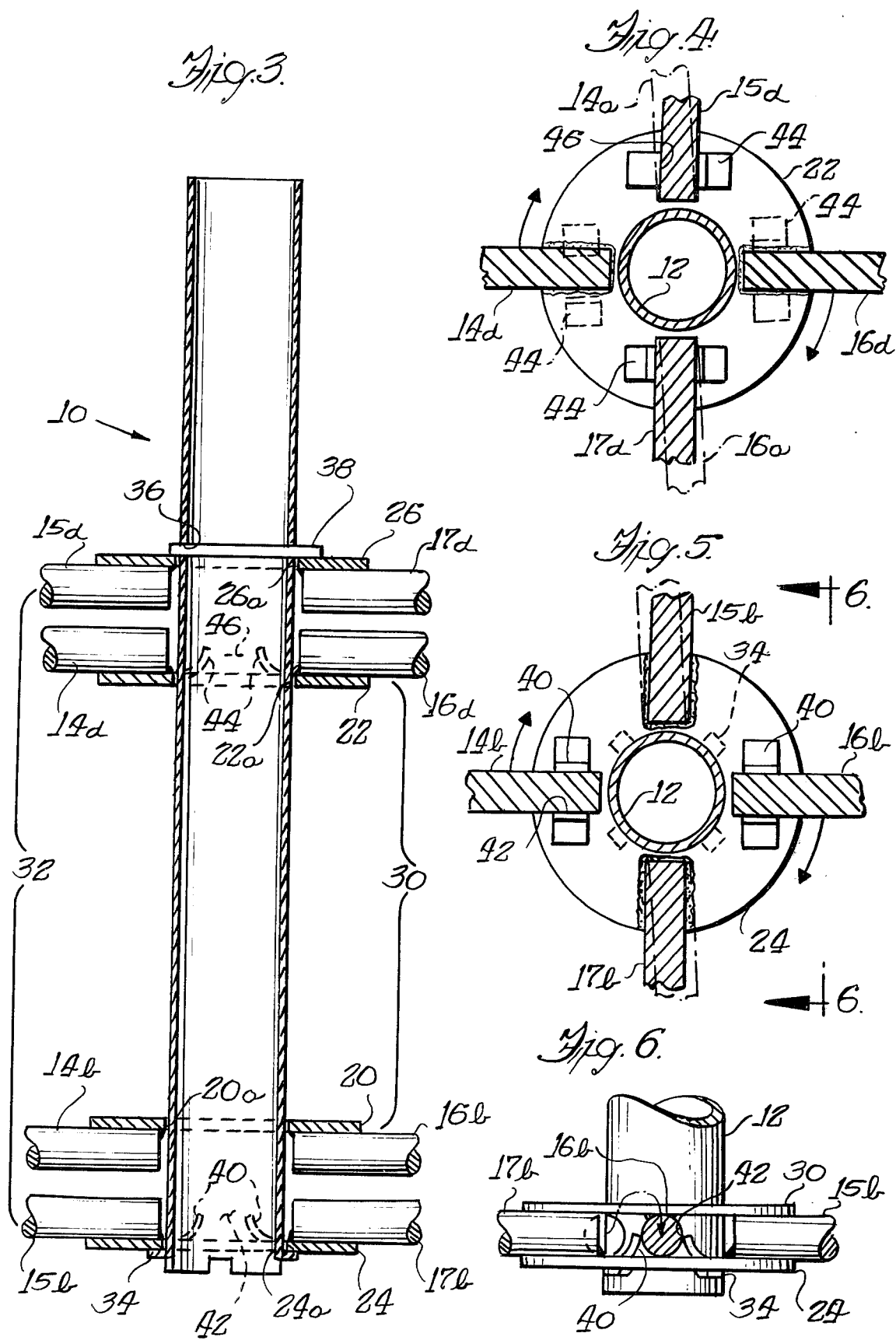

BASE FOR FREE STANDING MERCHANDISER

BACKGROUND OF THE INVENTION

This invention relates to collapsible or knockdown support stands used to support free standing merchandising displays or the like in an upstanding generally vertical orientation. The stand typically includes vertically oriented hub means into which the trunk, mast or column of the displayed article fits, and a plurality of radially extending legs spaced from one another to provide a wide and stable support. Preferably, the support stand is shipped or stored in a flattened condition and is erected without the need for structurally disassembling any of the components from one another, such as by removing bolts or other holding devices.

U.S. Pat. No. 3,387,808 discloses a collapsible stand having two pairs of opposing legs radially extending from the hub means. The stand is collapsed or set up by means of rotating one pair of legs relative to the other pair of legs to bring them substantially perpendicular to one another in the set up position or to near parallel relationship to one another in the collapsed position. In the patent, one pair of legs is welded to the upstanding post and the other pair of legs is welded to rotatable discs mounted on the shaft. In a commercially available structure made by the patent assignee, the legs are each attached to a rotatable disc. In both cases, the locking is achieved by butt ends of one set of legs abutting inner leg portions of the other set of legs. This locking action is subjected to large variations in tolerances because of the difficulty of precisely locating the butt ends. Thus, there is a need for a new stand of this general type.

SUMMARY OF THE INVENTION

This invention pertains to a collapsible stand of the type having two sets of legs extending radially from a tubular hub support, where the stand is collapsed or set up by rotating the legs relative to one another about the center axis of the hub support and where the legs are locked in a novel manner. Each set of legs is secured to a pair of spaced annular discs mounted over the hub support. The preferred legs are elongated rods each back folded on itself with outer ends serving as feet and with inner ends secured to the respective spaced discs. The inner ends of the legs are sandwiched between the discs. The improved locking means comprises a detent means having locking tabs struck from one pair of discs and spaced apart to define a detent slot therebetween to receive legs which are welded to the other discs. The resiliency of the back folded rods biases and holds the legs in the detent slots, but manual squeezing of the inner legs toward each moves the legs out of the detent slots in an axial direction thereby allowing the locking means to be intentionally disengaged to permit the stand to be collapsed. When the legs are locked by the detent means, the tabs abut the legs to prevent turning of the legs either in the clockwise or counterclockwise direction. The stand is economically fabricated and yet has a pleasing appearance in that the upper discs are unmarred and cover the detent means.

BRIEF DESCRIPTION OF THE DRAWINGS

FIG. 1 is a perspective view of a preferred embodiment of the collapsible support stand illustrated in its set up and upright position;

FIG. 2 is a view similar to FIG. 1, illustrating the stand in its collapsed position;

FIG. 3 is a sectional view as seen generally from line 3—3 in FIG. 2, except illustrating the inner legs in a squeezed together condition similar to that required to release the locking means and move the inner support elements to the collapsed position;

FIGS. 4 and 5 are sectional views as seen generally from lines 4—4 and 5—5, respectively, in FIG. 1; and FIG. 6 is a sectional view as seen generally from line 6—6 in FIG. 5, illustrating further the automatic engagement of the locking means when setting up the disclosed stand.

DETAILED DESCRIPTION OF THE INVENTION

As shown in the drawings for purposes of illustration, the invention is embodied in a support 10 for a merchandise display (not shown) and it comprises a tubular hub support shaft 12 and four separate radial support elements or legs 14, 15, 16 and 17. In the illustrated configuration, four support legs are disposed at 90° to each other with a first pair of support elements 14 and 16 aligned on opposite sides of the tubular support shaft 12, and likewise a second pair of support elements 15 and 17 are aligned on opposite sides of the tubular support 12. When the legs are spread in the configuration of FIG. 1, the stand will support the merchandise display. An important aspect of the stand is that it be collapsible for shipping and storage, as shown in FIG. 2, with the legs 14 and 15 being closely adjacent and the legs 16 and 17 being closely adjacent. To set up the stand, the legs 14 and 16 are rotated away from the other legs 15 and 17.

In the construction illustrated, the radial support elements are formed from elongated rods each back folded on itself almost a full 180° to present upper rod segments identified by the suffix a, lower rod segments identified by the suffix b and intermediate feet segments identified by the suffix c. As best seen in FIG. 3, the lower rod segments 14b and 16b are connected to an annular disc 20 and the upper rod segments 14a and 16a are connected to annular disc 22. Likewise, the support elements 15 and 17 are connected at the lower rod segments 15b and 17b to annular disc 24 and are connected at the upper rod segments 15a and 17a to annular disc 26. The upper and lower segments are actually biased to extend apart further in the vertical direction but they are held by their respective discs 20, 22, 24 and 26 which are prevented from upward shifting by a pin 38 (FIG. 3) in the shaft 12 and by outwardly struck tabs 34 underlying the lower disc 24.

It is to be noted that the discs 20 and 22 to which the support elements 14 and 16 are connected are located inwardly of and between the discs 24 and 26 to which the support elements 15 and 17 are connected. Thus, the support elements 14 and 16 hereinafter will be referred to as the inner radial support 30, while the support elements 15 and 17 hereinafter will be referred to as the outer radial support 32.

Each of the annular discs 20, 22, 24 and 26 has a central opening 20a, 22a, 24a and 26a that fits freely over the exterior of the tubular hub support shaft 12. The upper and inner of the ends 14d, 15d, 16d and 17d of the upper arm segments 14a, 15a, 16a and 17a are bent to be parallel to the plane of the disc to which it is attached. The upper, inner ends 14d, 15d, 16d, and 17d of the rod segments are connected to the annular discs with the discs being parallel to one another and disposed also perpendicular to the longitudinal center axis of the tubular hub support 12. Herein, the discs may freely rotate on the tubular hub support and may move axially therealong also. The upper and lower ends of the legs 14 are each welded to an inner disc 22 and 20. More specifically, inner end 14d is welded to the top side of inner disc 22, as best seen in FIG. 3, and inner end 14b is welded to the underside of the lower inner disc 20. The diametrically opposite leg 16 has an upper inner end 16d welded to the top side of the disc 22 diametrically opposite end 14d, as shown in FIG. 3. Lower and inner end 17b of the leg 17 is secured to the top side of disc 24 and is diametrically opposite inner end 15b of leg 15. Thus, the legs 14 and 16 may turn relative to the shaft 12 when their discs 20 and 22 are turned.

In a like manner, upper and inner ends 15d and 17d of legs 15 and 17 are secured to the underside of upper disc 26 at diametrically opposite points. Lower and inner ends 15b and 17b of the respective legs 15 and 17 are welded to the upper side of the disc 24 at diametrically opposite points. Thus, the legs 15 and 17 may turn relative to the shaft 12 with turning of the discs 26 and 24.

When the legs are rotated to the spread position shown in FIG. 1 for supporting the merchandise stand, the legs are locked against turning relative to each other, as such movement would render the stand less stable. Preferably, the legs are merely pulled and turned apart from each other from the position shown in FIG. 2 and the legs automatically snap and lock into place without the use of any tools or any fasteners.

In the knockdown position shown in FIG. 2, the upper two discs 26 and 22 are separate in a vertical direction by a distance about equal to twice the thickness of the rods as the legs are generally superimposed. However, in the locked position, the legs are no longer superimposed and the discs 26 and 22; 20 and 24 are closer together, as best seen in FIG. 6. In this embodiment of the invention, it is the inner two of the discs, viz., discs 22 and 20, which shift axially along the shaft 12 when the legs are shifted between the knockdown position of FIG. 2 and the supporting, locking position, shown in FIG. 1.

Herein, the preferred locking means is in the form of upstruck tabs 40 and 44 in the discs 22 and 24 which capture therebetween portions of the legs 14, 16 and 15, 17.

The lower disc 24 has formed from it upstanding tabs 40 which curve upwardly away from the disc and toward one another, and which define between the adjacent edges thereof an open detent slot 42 (see FIG. 3). Two pairs of such tabs are located on the disc (see FIG. 5) in opposed radial relationship relative to the centrally located tubular hub support element 12 and also approximately 90° offset from the connections to the disc of the rod segments 15b and 17b. The disc 20 is plain in appearance and has no tabs formed on it. The disc 22 has two pairs of tabs 44 formed thereon which again curve upwardly away from the disc and toward one another, and which likewise each defines between the adjacent edges thereof an open slot 46. The slots 46 are likewise offset approximately 90° from the connections to the disc 22 of the rod segments 14d and 16d. The disc 26 is plain in appearance and has no tabs formed thereon. The tabs 40 and 44 are curved from their respective discs 24 and 22 respectively toward the opposite adjacent discs 20 and 26, and the defined slots 42 and 46 are adapted to straddle and receive in the set up position of the stand the corresponding adjacent arm segments 14b and 16b, and 15d and 17d, respectively.

The number of tabs 40 may be reduced from that shown in that only a single pair of tabs 40 defining a single detent slot may be provided on each disc 20 or 24. However, from a strength and stability of locking standpoint, it is preferred to have two pairs of tabs on each disc thereby locking each leg. Rather than having upstruck portions of the discs serve as the detents, it would be possible to add separate members but such would add considerably to the cost. Manifestly, the number and/or shape of the tabs may be varied from that illustrated herein and still fall within the purview of the appended claims.

In a preferred embodiment, the stand is formed of support rod elements 14, 15, 16 and 17 of circular configuration typically of the order of at least 3/16ths of an inch and up to perhaps 7/16ths of an inch in diameter, and of a durable material, such as steel. This gives strength and rigidity to the unit. The rods are rigid, but their bent configuration provides an inherent resiliency or initial set such that the rod segments have a tendency to be further spread apart at the connected annular discs than the distance between either the outstanding tabs 34 and pin 38 with respect to both the outer radial support 32 and the inner radial support 30. Thus, the outer discs 24 and 26 are biased by the inherent resiliency of the back folded rods 15 and 17 to fit snug against the tabs 34 and the pin 38 respectively; and the inner discs 20 and 22 and the inner rod segments 14 and 16 are restrained axially by abutment directly against the discs and rod segments of the outer radial support 32.

It is to be understood that the stand 10 can be set up merely by rotating the inner discs 20 and 22 and their attached legs 14 and 16 relative to the outer discs 24 and 26 and their attached legs 15 and 17 which thereby causes the rod segments to ride up the inclined tabs 40 and 44 as the stand approaches the set up position and to fall into the locking slots 42 and 46 associated with the locking tabs. This axially and outwardly directed resiliency maintains the trapped rod segments firmly restrained between the tabs and precludes any rotation of the legs from their 90° disposition relative to one another when the stand 10 is in the locked set up position. This restraint is equally effective against rotation in either relative direction, and further is achieved by positive abutment of both rod segments at both the lower and upper intersections of the inner and outer radial supports 30 and 32, respectively. Thus, rod segments 14b and 16b are restrained at the lower intersection of the inner and outer radial supports and both rod segments 15d and 17d are restrained at the upper intersection of the inner and outer radial supports.

The stand 10 can be collapsed merely by squeezing toward each other the leg segments fixed to the inner discs 20 and 22 and then rotating the leg segments so that no leg segments are aligned with the detent notches 42 and 46. More specifically, the segments 14b and 14d and 16c and 16b are moved axially toward one another to slide the inner discs 20 and 22 closer together along the shaft 12 to achieve sufficient axial movement to remove the positioned rod segments from between the tabs 40 and 44 and then the legs 14 and 16 are rotated toward the other legs 15 and 17 and about the tubular hub support 12 until they are brought into near parallelism (see FIG. 2).

Conversely, the stand 10 can be readily set up since the camming or locking tabs 40 and 44 cam the corresponding appropriate rod legs up over the tabs into the locking slots 42 and 46 (see FIG. 6) and this is done almost simultaneously and automatically. Note also that the construction is attractive in that the exposed end edges of the rod legs are hidden from view as likewise are the tabs 40 and 44. In fact, the visible upper discs 20 and 26 have smooth surfaces for added attractiveness and safety. On the other hand, the locking tabs could be formed in the upper discs 20 and 26, rather than in the lower discs.

The stand is thus composed of relatively few and simple parts to provide a low cost and yet very stable and effective stand, particularly for a merchandiser. The locking of the legs at their predetermined positions assures that the stand legs will not be inadvertently rotated toward each other thereby allowing the stand to wobble or fall. By making the detent tabs integral with the discs, a low cost detenting means is provided.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A collapsible support stand being erectable into a locked position, said stand comprising a central support shaft, four legs having outer ends for engaging the floor and inner ends for attachment to said shaft,
   each of said legs having an upper segment and a lower segment extending from said outer ends toward said support shaft,
   a first upper support mounted on said shaft for axially sliding movement,
   inner ends of one pair of legs attached to said upper support,
   a lower support mounted on said shaft and movable axially along said shaft,
   inner ends of a pair of legs secured to said lower support,
   and detent means formed on at least one of said supports having an axially directed opening for receiving therein the inner ends of the other set of legs, said inner ends snapping into said detent openings when they are rotated into aligned and detenting position in which the legs are in said openings and are held by said detent means against rotation therefrom,
   said detented leg ends being removable from said detent openings by being moved axially and then turned therefrom to allow the pairs of legs to be swung toward each other to collapse the stand.

2. A collapsible support stand in accordance with claim 1 in which said upper and lower supports are discs mounted on said shaft and in which another upper and lower disc is mounted on said shaft with inner ends of a pair of legs attached thereto, said inner ends of the legs being sandwiched between a pair of upper discs and a pair of lower discs.

3. A collapsible support in accordance with claim 2 in which said detent means comprises integral tabs struck from a disc and spaced apart to define said opening for receiving the inner ends of a pair of legs not affixed to the disc having said tabs therein.

4. A collapsible support in accordance with claim 3 in which said detent means are formed on two said discs and in which tabs are struck from the disc at diametrically opposite locations on the same disc to provide two detenting locations on each disc.

5. A collapsible support in accordance with claim 4 in which said detent means are formed in the lower ones of the discs of said lower pairs of discs.

6. A collapsible support in accordance with claim 1 in which said detent means comprises a pair of tabs struck from the support at spaced locations to define therebetween the openings for receiving the inner leg ends therein, said tabs having curved surfaces for camming the inner rods in an axial direction to compress the legs which then expand and snap into the opening between the tabs.

7. A collapsible stand, comprising a central hub support, sets of support elements mounted on the hub support and extended radially therefrom, the sets of support elements being movable relative to each other between a collapsed position whereat they are in near parallel relation and a set up position whereat they are in sharp angular relation, each set of the support elements being formed of upper and lower annular discs fitted over the hub support and an elongated rod back folded on itself and presenting upper and lower end segments secured to the respective discs and a medial foot segment, the discs of one set of support elements being located outwardly adjacent the discs of another set of support elements and the adjacent upper discs and the adjacent lower discs sandwiching the respective upper and lower rod end segments therebetween, a pair of locking tabs formed from one disc of each of the adjacent discs and defining a slot therebetween adapted to receive and straddle in locking relationship the respective rod segment secured to the adjacent disc when the stand is in the set up position, and means constraining the axial location of the discs of the outer set of support elements.

8. A collapsible stand according to claim 7, wherein the back folded rod of at least the inner set of support elements has resiliency to bias the discs secured thereto axially outward and against the discs and rod end segments of the outer set of support elements.

9. A collapsible stand according to claim 7, wherein each of the tabs is curved upwardly from its disc toward one another and toward the adjacent disc.

10. A collapsible stand according to claim 7, wherein each set of support elements has two elongated rods each back folded on itself and disposed when secured to the respective upper and lower discs in generally aligned relationship on opposite sides of the hub support.

11. A collapsible stand according to claim 7, wherein the tabs are formed from the lower disc of each of the adjacent discs.

* * * * *